United States Patent [19]

Tatsumi et al.

[11] Patent Number: 4,915,243

[45] Date of Patent: Apr. 10, 1990

[54] RESIN-LAMINATED RUBBER CLOSURE FOR A MEDICAL VIAL

[75] Inventors: Yutaka Tatsumi; Hideo Yoshitaka; Tatsuya Matsunaga, all of Yaizu; Denpei Sudo, Sumida; Tamotsu Okuda, Noda, all of Japan

[73] Assignees: Daikyo Gomu Seiko, Ltd.; Yamanouchi Pharmaceutical Co., Ltd., both of Tokyo, Japan

[21] Appl. No.: 185,363

[22] Filed: Apr. 19, 1988

Related U.S. Application Data

[63] Continuation of Ser. No. 867,677, May 28, 1986, abandoned.

[30] Foreign Application Priority Data

May 28, 1985 [JP] Japan .................. 60-113255[U]
Jul. 15, 1985 [JP] Japan .................. 60-106875

[51] Int. Cl.⁴ .............................................. B65D 39/00
[52] U.S. Cl. ........................................ 215/247; 215/364
[58] Field of Search ................................ 215/247, 364

[56] References Cited

U.S. PATENT DOCUMENTS

| | | |
|---|---|---|
| 2,705,211 | 3/1955 | De Wyk . |
| 3,760,969 | 9/1973 | Shimamoto .................. 215/364 X |
| 4,193,402 | 3/1980 | Rumpler ...................... 215/247 X |
| 4,301,936 | 11/1981 | Percarpio .................... 215/247 |
| 4,441,621 | 4/1984 | Matukura et al. ............ 215/247 |
| 4,459,256 | 7/1984 | Ziegler ....................... 264/152 |
| 4,614,276 | 9/1986 | Ihara et al. .................. 215/364 |

FOREIGN PATENT DOCUMENTS

| | | |
|---|---|---|
| 0086253 | 8/1983 | European Pat. Off. . |
| 0163251 | 12/1985 | European Pat. Off. . |
| 3231179 | 8/1982 | Fed. Rep. of Germany . |
| 1538462 | 7/1968 | France ....................... 215/364 |

Primary Examiner—Donald F. Norton
Attorney, Agent, or Firm—Wenderoth, Lind & Ponack

[57] ABSTRACT

A resin-laminated rubber closure for a medical vial is provided herein. This closure comprises an annular leg part to be inserted into the mouth of the vial, which leg part is notched or cut at least at one position and a flange part to be contacted with the front surface of the vial mouth, wherein the outer and inner surfaces of the annular leg part is provided with a chemical-resistant resin film laminated thereon except for the upper end of the leg part so that the rubber surface is exposed at the upper end of said leg portion, and wherein the leg part has at least one protrusion on the outer surface of the laminated portion. The present invention also relates to a molding process for economically producing said closure.

3 Claims, 7 Drawing Sheets

FIG.2(a')
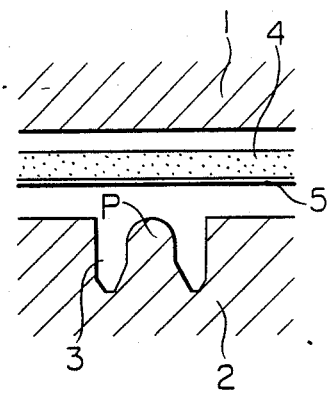
FIG.2(b')
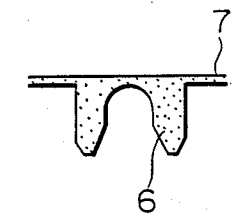
FIG.2(c')
FIG.2(d')
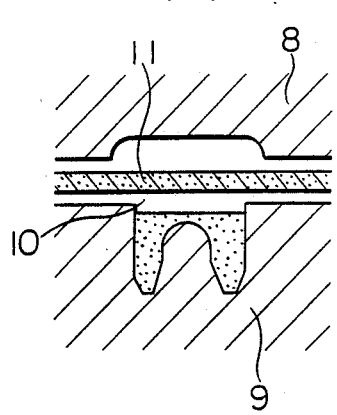
FIG.2(e')
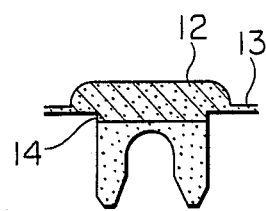
FIG.2(f')
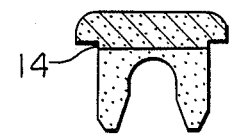

FIG.3(a")
PRIOR ART
FIG.3(b")
PRIOR ART
FIG.3(c")
PRIOR ART
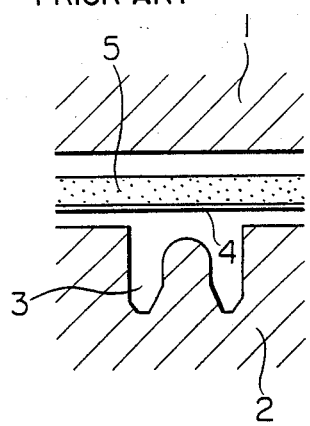
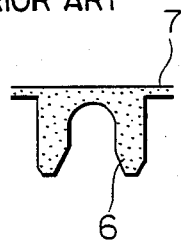
FIG.3(d")
PRIOR ART
FIG.3(e")
PRIOR ART
FIG.3(f")
PRIOR ART
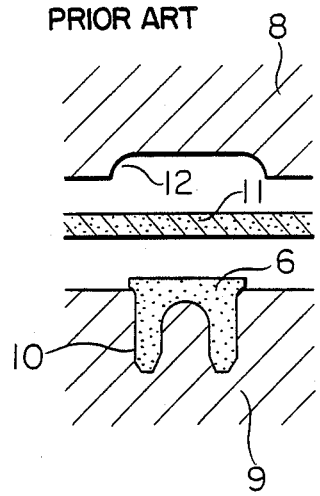
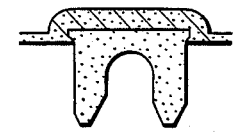
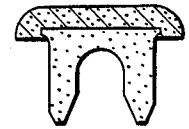

RESIN-LAMINATED RUBBER CLOSURE FOR A MEDICAL VIAL

This application is a continuation of now abandoned application Ser. No. 867,677, filed May 28, 1986.

BACKGROUND OF THE INVENTION

1. Field of the Invention

This invention relates to a process for the production of a rubber closure or plug for a medical vial or bottle and a resin-laminated rubber closure member produced thereby.

2. Description of the Prior Art

Rubber closures for vials, containing vulcanization accelerators or other compounding agents, have hitherto been fraught with problems in that medical or pharmaceutical products held by such rubber closures are deteriorated during preparation or storage by these agents, i.e. contaminated with fine particles thereof.

In order to solve such a problem, there have been proposed rubber closures for vials, in which the leg part is wholly laminated with a fluoro resin to prevent the rubber of the leg part from direct contact with a solution of a medical or pharmaceutical product, thus preventing impurities contained in the rubber from dissolving in the solution (Japanese Patent Publication Nos. 9119/1979 and 1355/1977 and Utility Model Publication Nos. 27753/1969, 17831/1970 and 21346/1974). For the production of such a rubber closure or stopper, the inventor has also proposed a process for producing a laminated rubber closure by a two stage molding as shown in FIG. 3 (Japanese Patent Publication No. 53184/1982). That is, this process comprises a first step of placing a chemical-resistant resin film 4 with a larger size than the outer diameter of a finished product and a non-vulcanized rubber sheet 5 in this order on a lower metal mold 2 with an annular recess for forming an annular leg part of a rubber closure to be inserted into the mouth of a vial, placing an upper metal mold 1 thereon, heating and pressing them between the lower metal mold 2 and upper metal mold 1 to form a base body whose lower surface is covered with the resin film and whose upper surface is an exposed rubber surface and then cutting the flange part 7 of the base body, in contact with the rim of the vial neck, to give a width of at most 2/3 times that of the finished product, thereby forming an intermediate closure, and a second step of stacking another non-vulcanized rubber sheet 11 on the upper surface of the intermediate closure charged in the lower metal mold and heating and pressing them by the use of another upper metal mold having a recess 12 for forming an enlarged cap part with the same diameter as the outer diameter of the flange part of the finished product, in contact with the rim of the vial neck, thereby forming the finished product.

Lately, in order to improve the quality of a medical drug such as cephalosporin, it has been required to maintain the vial airtight for a longer period of time than in the prior art. The inventors have conducted studies to meet with this requirement and thus have proposed a resin-laminated rubber closure A as shown in FIG. 4 in which the outer circumference of the upper end 2 of the annular leg part is not laminated to expose the rubber surface (Japanese Utility Model Application No. 116191/1984). Production of this rubber closure can be carried out by the above described processed proposed by applicant, in which the flange part 7 of the base body is cut so as to retain no burr in the first step, but the production efficiency is very low.

SUMMARY OF THE INVENTION

It is an object of the present invention to provide a process for the production of a rubber closure or plug for a medical vial, whereby the above described drawbacks of the prior art can be overcome.

It is another object of the present invention to provide a resin-laminated rubber closure member in which the height of a hollow part inside an annular leg part is larger than that of the upper end of the laminated part from the lower end thereof.

It is a further object of the present invention to provide a process for the production of a resin-laminated rubber closure in which the outer circumference of the upper end of an annular leg part is not laminated to expose the rubber surface.

These objects can be attained by a process for the production of a resin-laminated rubber closure for a medical vial, which comprises a step (1) of hot pressing and vulcanizing a non-vulcanized compound rubber plate on one side of which a fluoro-resin is laminated between a first metal mold for forming a leg part which mold is provided with a hollow part of W-type, in cross section, corresponding to the profile of the leg part and another first metal mold for forming an upper part which mold is provided with a hollow part of truncated cone type or is plate-shaped and thereby obtaining a primary molded article consisting of the leg part completely laminated with the fluoro resin and the upper truncated cone part or flat part, not laminated with the fluoro resin, a step (2) of removing the burr part, a step (3) of charging the thus obtained primary molded article in a second metal mold for forming a leg part which mold is provided with a hollow part of W-type, in cross section, being adapted to the profile of the leg part and having a larger depth than the first metal mold, placing thereon a non-vulcanized compound rubber plate, hot pressing and vulcanizing this rubber plate by the use of another second metal mold for forming a flange part which mold is provided with a hollow part corresponding to the profile of the flange part, and thereby forming the leg part and flange part and integrating with the primary molded article and a step (4) of removing the burr part and thus obtaining a rubber closure in which the leg part is completely laminated with the fluoro-resin except for the outer circumference of the upper end part of the leg part.

BRIEF DESCRIPTION OF THE DRAWINGS

The accompanying drawings are to illustrate the principle and merits of the present invention in greater detail.

FIGS. 2(a'), 2(b'), 2(c'), 2(d'), 2(e') and 2(f') are schematic views illustrating another embodiment of the steps for producing rubber closures for vials according to the present invention.

FIGS. 3(a'') to 3(f'') are schematic views illustrating the steps for producing rubber closures for vials according to the prior art.

DETAILED DESCRIPTION OF THE INVENTION

Figure 1A:
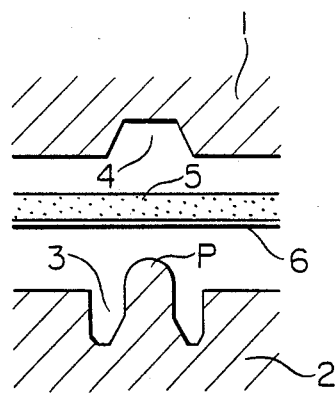
FIGS. 1(a), 1(b), 1(c), 1(d), 1(e) and 1(f) are schematic views illustrating one embodiment of the steps for producing rubber closures for vials according to the present invention.
Figures 1B, 1C:
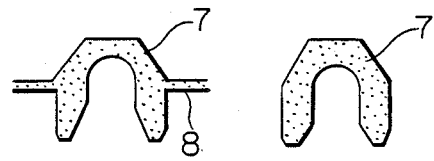
Figure 1D:
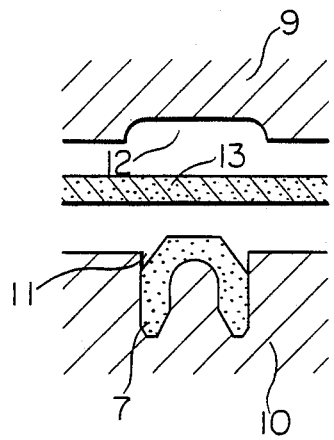

The inventors have made various studies on the cutting operation in the above described known process for the production of a laminated rubber closure and consequently, have found that the depth of an annular hollow of a lower metal mold in the second step is made deeper than that of a lower metal mold in the first step and a non-laminated rubber plate is applied to the upper part of a primary molded article, followed by hot pressing, vulcanizing and integrating them, whereby to form an exposed rubber surface at the upper end of the leg part more effectively than in the known process. Furthermore, if the top of a primary molded article is of a truncated cone, the height of the central ceiling part inside an annular leg part can readily be higher to make a needle-piercing part thinner without hollowing the upper surface of the flange part of the rubber closure, and the upper part of the leg part and the flange part, molded over the primary molded article can strongly be bonded and integrated with the primary molded article.

Accordingly, the present invention provides a process for the production of a resin-laminated rubber closure or plug for a medical vial or bottle, as exemplified in FIG. 1 and FIG. 2, which comprises a step (1) of hot pressing and vulcanizing a non-vulcanized compound rubber plate 5 on one side of which a fluoro-resin 6 is laminated between a first metal mold 2 for forming a leg part which mold is provided with an annular hollow part 3 of W-type, in cross section, corresponding to the profile of the leg part and another first metal mold 1 for forming an upper part which mold is provided with a hollow part of truncated cone type 4 or is plate-shaped (1 of FIG. 2) and thereby obtaining a primary molded article 7 consisting of the leg part completely laminated with the fluoro-resin and the upper truncated cone part or flat part, not laminated with the fluoro-resin, a step (2) of removing a burr part 8, a step (3) of charging the thus obtained primary molded article in a second metal mold 10 for forming a leg part which mold is provided with an annular hollow part 11 of W-type, in cross section, being adapted to the profile of the leg part and having a larger depth than the first metal mold 2, placing thereon a non-vulcanized compound rubber plate 13, hot pressing and vulcanizing this rubber plate by the use of another metal mold 9 for forming a flange part of the rubber closure which mold is provided with a hollow part corresponding to the profile of the flange part and thereby forming the upper part of the leg part and flange part and integrating with the primary molded article and a step (4) of removing a burr part 15 and thus obtaining a rubber closure in which the leg part is completely laminated with the fluoro-resin except the outer circumference 16 of the upper end of the leg part.

According to the process of the present invention, a resin-laminated rubber closure capable of maintaing a higher degree of airtightness for a longer period of time is provided herein while a medical vial is half closed by the rubber closure while subjecting a medical drug solution to freeze drying. The vial is then completely closed and secured by an aluminum sealing cap. The closure can be effectively mass-produced, since the annular hollow part 11 of a second metal mold is made deeper than the annular hollow part 3 of a first metal mold and the non-laminated upper part 16 of a leg part and the flange part 14 are formed on and integrated with the upper part of the primary molded article 7 as shown in FIG. 1.

The top part of a primary molded article can be made flat as shown in FIG. 2, but in a more preferred embodiment of the present invention, the top can be formed into a truncated cone to increase the height of the central ceiling part inside an annular leg part, corresponding to a needle-piercing position, whereby the needle-piercing part can be made thinner without hollowing the upper surface of the flange part of a rubber closure and the upper part of the leg part and flange part can further be bonded and integrated strongly with the primary molded article.

The non-vulcanized compound rubber plate used in the present invention is of a synthetic or natural rubber such as butyl rubber, isoprene rubber, butadiene rubber, halogenated butyl rubber, ethylene propylene terpolymer, silicone rubber and the like. As the fluoro-resin to be laminated, there can for example be used tetrafluoroethylene polymer, trifluorochloroethylene polymer, tetrafluoroethylene-hexafluoropropylene copolymer, vinylidene fluoride polymer, vinyl fluoride polymer, tetrafluoroethylene-ethylene copolymer and trifluorochloroethylene-ethylene copolymer. The laminated resin film has preferably a thickness of 0.002 to 0.5 mm.

Referring to FIG. 1 and FIG. 2, preferred embodiments of the present invention will now be illustrated. A first metal mold 2 for forming a leg part has an annular hollow part 3 of W-type corresponding to the profile of the leg part, as shown in (a) and (a'). The height of the central top P of the annular hollow part of W-type is higher than that of the outer circumference of the annular hollow part (FIG. 1(a)) or substantially similar thereto (FIG. 2(a')). When the top part is made higher, the thickness of rubber of the ceiling part is thinner and an injection needle can readily be pierced when using an injection liquid. A first metal mold 1 for forming an upper part has a hollow part 4 of truncated cone type (FIG. 1(a)) or is plate-shaped (FIG. 2 (a)). A non-vulcanized compound rubber plate on one surface of which is laminated a surface-treated fluoro-resin film is arranged between both the metal molds, pressed, heated and thus vulcanized, thus obtaining a primary molded article 7 or 6 whose leg part is completely laminated with the fluoro-resin film and whose upper part is of a truncated cone form or of a plate form, not laminated. The pressing and heating conditions in this step, depending upon the quality of a fluoro-resin laminated plate employed, the variety of a compound rubber, compounding agents, the thickness of the laminated plate, etc., are preferably 150° to 175° C. and 40 to 70 kg/cm² for about 10 minutes, for example, 160° to 165° C. and about 50 kg/cm² for about 15 minutes in the case of using a tetrafluoroethylene-ethylene copolymer film and a compound rubber containing 58% of butyl rubber.

The primary molded article is taken out of the metal mold and then subjected to a punching operation to remove a burr 8 or 7 at the circumference, thus obtaining a primary molded article as shown in (c) or (c'). The thus obtained primary molded article 7 or 6 is charged in a second metal mold 10 or 9 having an annular hollow part 11 or 10 of W-type, in cross section, and corresponding to the form of the leg part, the hollow part being deeper than that of the first metal mold 2, as shown in (d) or (d'). A non-vulcanized compound rubber plate 13 or 11 is placed thereon and then subjected to hot pressing and vulcanizing by the use of another metal mold 9 or 8 having a hollow part 12 corresponding to the shape of the upper part. This vulcanization step is carried out at a temperature of 160° to 175° C. for about 8 minutes. During the same time, the primary molded article and upper rubber plate are integrated and bonded strongly. When the central ceiling part inside the annular leg part is higher than usual, the thickness of the upper part can be made so thin that when using the resulting rubber closure for a medical vial, piercing of an injection needle can more readily be effected. Then, the secondary molded article is taken out of the second metal mold and subjected to removal of the circumferential burr 15 or 13, thus obtaining a finished product shown as (f) or (f').

Figures 1E, 1F:
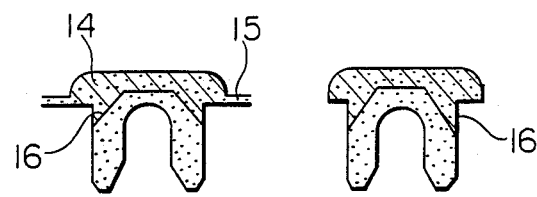
Figure 4:
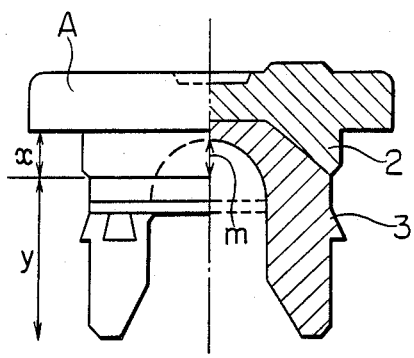
FIG. 4 is a side sectional view of a rubber closure of the present invention.

In the present invention, the outer shape or profile of a leg part of a resin-laminated rubber closure can be suitably varied from a simple form as shown in FIG. 1(f) to a complex form wherein a level difference 2 and projection or protrusion 3 are provided between the upper end and lower end of the leg part as shown in FIG. 4 by changing the first metal mold or second metal mold.

Referring to FIG. 4, a rubber closure suitable for freeze drying has an annular leg part which is cut or notched at two positions and which is laminated with a fluoro-resin so as to give a length y of laminated part and a length x of exposed rubber part on the outer surface of the leg part, and has a central ceiling part inside the leg part, which ceiling part has an increased height m from the upper end of the laminated part. Preferably, m is in the range of 0.1 to 5 mm. The airtightness when a vial is completely closed can be held by the length x and the needle-piercing property can be improved without lowering the upper surface of the flange part, i.e. without hollowing it, to a great extent by increasing the height m of the central ceiling part, while simultaneously avoiding or reducing a wiping operation using alcohol at the upper surface of the rubber closure. The protrusion 3 functions to determine the position of the rubber closure when a vial is half closed thereby and to prevent the rubber closure from sinking in the vial due to lubricity of the fluoro-resin film.

According to the process for the production of a resin-laminated rubber closure according to the present invention, a rubber closure member with a special form suitable for a medical or pharmaceutical product can be economically produced. For example, fluoro-resin laminated rubber closures having special forms can effectively be produced such as having an exposed rubber surface at the upper end of a leg part so as to improve the adaptability as well as airtightness to the mouth of a vial, having a leg part whose upper end portion is enlarged in size, and having a leg part provided with a projection or protrusion on the outside thereof and having a central upper part with a reduced thickness for piercing an injection needle.

Figure 5:
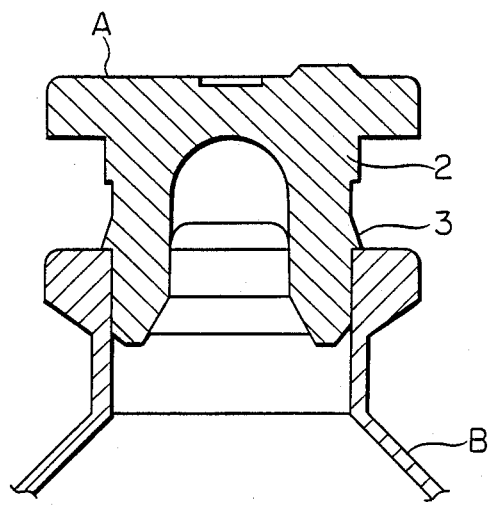
FIG. 5 is a side sectional view of a rubber closure of the present invention, half closing the mouth of a vial.
Figure 6:
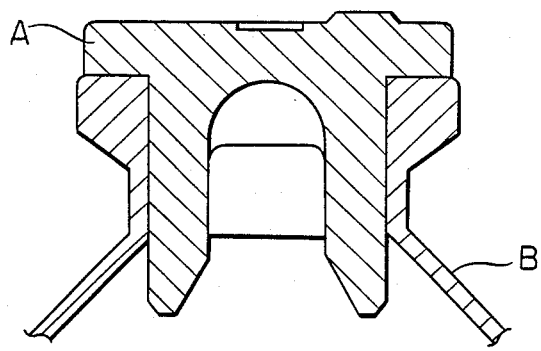
FIG. 6 is a side sectional view of a rubber closure of the present invention, completely closing the mouth of a vial.
Figure 7:
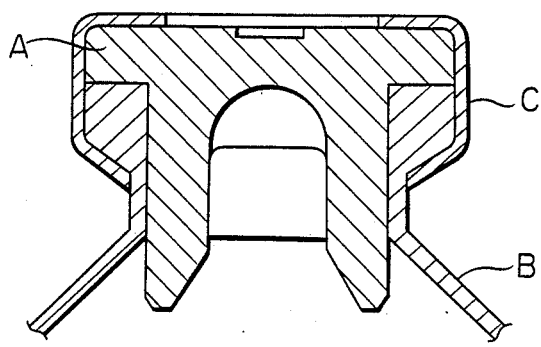
FIG. 7 is a side sectional view of a rubber closure of the present invention, completely closing the mouth of a vial, which is fastened by an aluminum cap.

When using the resin-laminated rubber closure for a vial, produced by the process of the present invention, the mouth of a vial B is half closed by a rubber closure A as shown in FIG. 5, the half closed vial is subjected to freeze drying in a freeze-drying chamber and completely closed therein as shown in FIG. 6, and the flange part and the neck of the vial are fastened by an aluminum cap C as shown in FIG. 7, thus obtaining a medical vial as a finished product.

Figure 8:
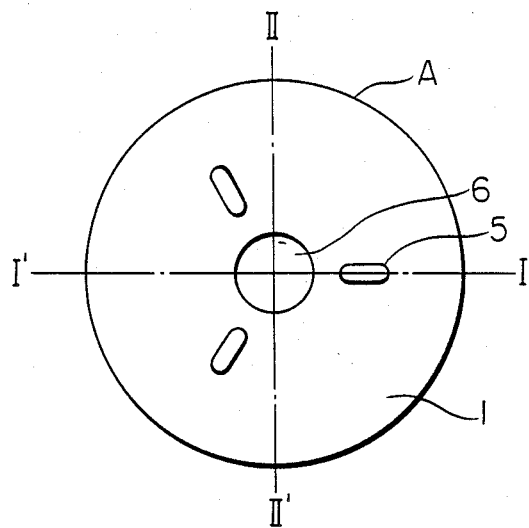
FIG. 8 is a plane view of a rubber closure of the present invention.
Figure 9:
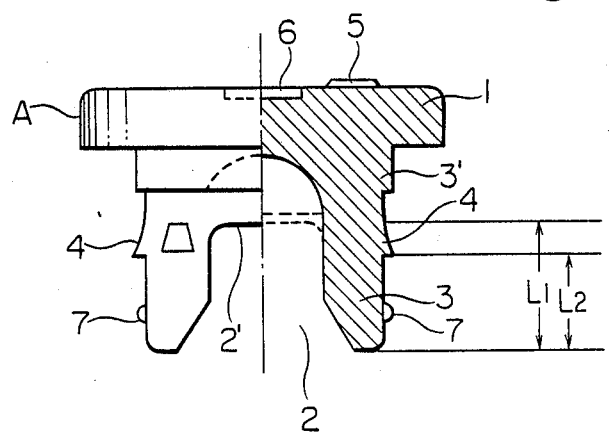
FIG. 9 is a partly side sectional view taken on line I—I' of FIG. 8.
Figure 10:
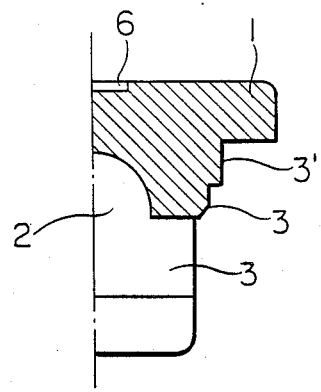
FIG. 10 is a partly side sectional view taken on line II—II' of FIG. 8.

An example of a fluoro-resin laminated rubber closure having a special profile as shown in FIG. 4, produced by the process of the present invention, will now be illustrated in greater detail referring to FIG. 8 to FIG. 10.

This rubber closure comprises a main body 1 and annular leg part 3 and 3' the outer surface of which is laminated with a chemical resistant resin and on which protrusions 4 are provided in the form of a semi-trigonal pyramid as shown in FIG. 9, a level difference, a rib or a ring. The upper end part 3' of the leg part is not laminated to retain an exposed rubber surface and the other part thereof is completely laminated with the chemical resistant resin.

When the rubber closure A is put in a vial B as shown in FIG. 5, the rubber closure A is engaged with the mouth of the vial at a constant height by the protrusion 4 functioning as a stopper even if the mouth diameter of the vial is somewhat fluctuated, during which an opening part 2 of the rubber closure is kept constant. When the vial B is half closed by the rubber closure A, therefore, the rubber closure is prevented from rising or sinking more than required even if the mouth diameter of the vial is somewhat changed and when subjecting to freeze drying, a constant quantity of vapor is always exhausted through the constant opening part 2 and a constant degree of vacuum is held in the vial. Thus, the freeze drying can be completed in a shorter time. Complete closure is carried after charging nitrogen gas or the like as shown in FIG. 6. In this step, pressing is carried out using a large press, during which the protrusion on the leg part acts as a buffer to protect the vial from breakage. The closed vial is then fastened by the use of an aluminum cap as shown in FIG. 7. When the height of from the lower end of the leg part to the upper end of the opening part 2 is represented by $L_1$ and the height of from the lower end of the leg part to the lower end of the protrusion is represented by $L_2$, the ratio of $L_1/L_2$ should preferably be 1.17 to 1.5, i.e. the height $L_1$ should be higher to position suitably the opening part 2 of the rubber closure.

As freeze drying has recently been carried out in a large-sized vessel and operations of automation have accordingly increased, the requirements for stabilization of the half closed state have become severer. When the rubber closure is controlled only in respect to the vertical position by the protrusion 4, a lateral movement or rolling phenomenon often occurs to incline or cause the rubber closure to slip off. In order to prevent this phenomenon, another protrusion 7 should preferably be provided below the protrusion 4, thereby increasing the stability of the rubber closure when the vial is half closed. 5 represents a convex part for fastening the surface of the rubber closure and 6 represents a hollow part through which an injection needle is to be pierced. The main body of the rubber closure is made thinner at this position for the ease of piercing an injection needle.

As apparent from the foregoing descriptions, the process of the present invention can mass-produce a chemical resistant resin laminated rubber closure having a complicated or specified profile suitable for the freeze drying operation, capable of giving a medical vial free from contamination with foreign matters and excellent in airtightness for a long period of time.

What is claimed is:

1. A resin-laminated rubber closure for a medical vial comprising an annular leg part to be inserted into the mouth of the vial, the leg part being notched at least at one position, and a flange part to be contacted with the front surface of the vial mouth, in which the outer and inner surfaces of the annular leg part are laminated with a chemical-resistant resin film except for the outer circumference of the upper end of the leg part to expose a rubber surface at this upper end leg part and to form an upper edge of the laminated portion and the leg part has a central ceiling part inside and one or more protrusions on the outer surface of the laminated portion, wherein the rubber surface above the upper edge of the laminated portion has a length (x) of 0.1 to 5 mm and wherein the height (m) of the central ceiling part inside the annular leg part from the upper edge of the laminated portion is in the range of 0.1 to 5 mm said chemical-resistant resin film being of a material selected from the group consisting of tetrafluoroethylene polymers, trifluorochloroethylene polymers, tetrafluoro-ethylene-hexafluoropropylene copolymers, vinylidene fluoride polymers, vinyl fluoride polymers, tetrafluoroethylene-ethylene copolymers and trifluorochloroethylene-ethylene copolymers and the central ceiling part inside the annular leg part having a height greater than that of the upper edge of the laminated portion.

2. The resin-laminated rubber closure of claim 1, wherein the protrusion has a height of 0.1 to 1.0 mm.

3. The resin-laminated rubber closure of claim 1, wherein the chemical-resistant resin film has a thickness of 0.002 to 5 mm.

* * * * *